United States Patent [19]
Little et al.

[11] Patent Number: 6,069,415
[45] Date of Patent: May 30, 2000

[54] OVERLOAD PROTECTION DEVICE

[75] Inventors: Robert D. Little, Apex; Prasad Balakrishnan, Raleigh, both of N.C.

[73] Assignee: ATI Industrial Automation, Inc., Garner, N.C.

[21] Appl. No.: 09/092,539

[22] Filed: Jun. 5, 1998

[51] Int. Cl.[7] .................................................. H02H 1/00
[52] U.S. Cl. .............................................. 307/326; 901/11
[58] Field of Search ................................. 395/80, 90, 91; 307/326–328; 901/11

[56] References Cited

U.S. PATENT DOCUMENTS

| | | | |
|---|---|---|---|
| 4,639,184 | 1/1987 | Knasel et al. | 414/730 |
| 4,655,674 | 4/1987 | Kohler et al. | 414/735 |
| 4,661,038 | 4/1987 | Kohler et al. | 414/730 |
| 4,700,932 | 10/1987 | Katsuno | 267/136 |
| 4,714,865 | 12/1987 | Chin et al. | 318/563 |
| 4,717,003 | 1/1988 | McCormick et al. | 192/56 |
| 4,786,769 | 11/1988 | Knasel et al. | 200/61.41 |
| 4,797,564 | 1/1989 | Ramunas | 307/119 |
| 4,842,114 | 6/1989 | Hepp | 192/56 |
| 4,848,546 | 7/1989 | McCormick et al. | 192/56 |
| 4,954,005 | 9/1990 | Knasel et al. | 403/57 |
| 4,995,493 | 2/1991 | Cotsman et al. | 192/150 |
| 4,998,606 | 3/1991 | McCormick et al. | 192/56 |
| 5,040,915 | 8/1991 | Stuart et al. | 403/322 |
| 5,086,901 | 2/1992 | Petronis | 192/150 |
| 5,484,219 | 1/1996 | Drew et al. | 403/57 |
| 5,558,182 | 9/1996 | De La Fuente et al. | 188/67 |

FOREIGN PATENT DOCUMENTS

| | | |
|---|---|---|
| 3701651 | 4/1988 | Germany . |
| 2189458 | 10/1987 | United Kingdom ............ 17/2 |

*Primary Examiner*—Jeffrey Gaffin
*Assistant Examiner*—Ed Garlepp
*Attorney, Agent, or Firm*—Moore & Van Allen, PLLC; Michael G. Johnston; D. Brent Lambert

[57] ABSTRACT

Disclosed is an overload protection device to be placed between a robot and a tool to be used by the robot to prevent damage when the tool encounters an obstacle. The overload protection device comprises a housing, a cam, and a piston. The housing includes an internal cavity and an external opening to the cavity. The cam includes a head portion retained within the cavity and a neck portion extending through the opening. The neck portion and the opening include matching conical surfaces adapted to mate with one another. The piston is disposed within the cavity and tends to urge the cam toward a home position. When the tool is displaced in the x, y, z, or rotational directions during an overload condition, the cam is displaced from the home position. The piston then urges the cam to return to the home position regardless of the direction of displacement. A single sensor is provided to detect an overload condition.

13 Claims, 6 Drawing Sheets

OVERLOAD PROTECTION DEVICE

BACKGROUND OF THE INVENTION

1. Field of the Invention

The present invention relates generally to the field of compliance devices and more particularly to overload protection devices for robots and other automatic machines.

2. Description of Related Art

Robots have been used for many years in industrial assembly line applications to perform repetitive tasks very precisely without the need for human operation, interaction, or supervision. For instance, robots are commonly used in the automotive industry to perform a number of tasks such as material handling and spot-welding of automobile bodies.

The robot often has a tool, either permanently or removably attached to the end of its arm, which enables it to perform its assigned function. Occasionally, the tool may encounter unexpected obstacles in the production line environment. If the tool impacts the obstacle with sufficient force, or if the robot continues to move once the tool has come into contact with the obstacle, the tool or the robot arm itself may become damaged. In order to avoid this undesirable result, devices are connected between the robot arm and the tool to give the tool a limited amount of freedom of movement (referred to as "compliance") when it encounters an obstacle. These devices, which may be referred to as "overload protection devices", often contain springs, air pistons, or other means for providing resilient compliance.

When the overload protection device complies as a result of the tool encountering an obstacle, this is referred to as an "overload condition." Most overload protection devices are provided with a plurality of sensors which detect an overload condition and let the robot know that it should stop moving until the overload condition is removed.

Because an obstacle can exert different forces on the tool depending upon where the two come into contact, it is desirable for an overload protection device to provide freedom of movement in as many directions as possible (e.g., freedom in the x, y, and z directions, as well as rotational freedom). The more degrees of freedom, the less likely the tool or the robot will be damaged.

Because the environments in which robots are used are sometimes hostile and unsafe for humans, it is also desirable for the overload protection device to be capable of automatically returning to its original position ("resetting") when the overload condition no longer exists, without the need for human intervention. Unfortunately, the more directions in which an overload protection device is capable of complying, the less likely it is to be capable of automatically resetting itself. This is particularly true of overload protection devices capable of rotational (twisting) compliance, since the device must be rotated back to the proper position.

Therefore, it would be desirable to provide an overload protection device capable of resetting itself regardless of whether the overload condition was due to linear or rotational movement.

Greater freedom of movement also normally means that more sensors are required to detect an overload condition, since displacement of the overload protection device can occur in a variety of directions. Each additional sensor, however, adds additional expense to the overload protection device. Therefore, it would also be desirable to provide an overload protection device that exhibits compliance in a plurality of directions, but requires only one sensor to detect an overload condition.

It would also be desirable to provide an overload protection device whose resilient compliance is softer during an overload condition than during non-overload conditions. This would allow the tool to move freely once it has broken free, thereby reducing the likelihood that damage will occur to the tool or to the robot.

BRIEF SUMMARY OF THE INVENTION

Therefore, it is an object of the present invention to provide an overload protection device capable of resetting itself regardless of whether an overload condition is caused by linear or rotational movement.

It is a further object of the invention to provide an overload protection device that exhibits compliance in a plurality of directions, but requires only one sensor to detect an overload condition.

Finally, it is an object of the invention to provide an overload protection device whose resilient compliance is softer during an overload condition than during non-overload conditions.

The overload protection device of the present invention is adapted to be disposed between a work tool and an instrumentality controlling the work tool to provide protection from damage when the work tool encounters an obstacle in its operating environment. The overload protection device comprises, among other things, a housing and a cam. The housing is attached to either the work tool or the instrumentality controlling the work tool, and comprises an internal cavity and an external opening to the cavity.

The cam includes a first portion retained within the cavity and a second portion extending through the opening and attached to whichever of the work tool and the instrumentality controlling the work tool is not attached to the housing. The cam is normally oriented at a home position relative to the housing during non-overload conditions, but has the freedom to rotate and move away from the home position relative to the housing when the work tool forcibly encounters an obstacle, thereby providing the work tool with compliance during an overload condition.

The overload protection device further comprises means for applying force to the cam tending to cause it to remain in the home position relative to the housing during non-overload conditions and tending to cause it to return to the home position relative to the housing when it has been displaced during an overload condition. Preferably said means is capable of returning the cam to the home position regardless of whether it was moved or rotated away from the home position. Preferably, the amount of force applied by said means during non-overload conditions is greater than the amount of force applied during an overload condition.

The second portion of the cam and the opening to the cavity preferably have corresponding conical or frustoconical surfaces which mate with one another when the cam is in the home position relative to the housing.

One or more protrusions are preferably provided on the first portion of the cam. One or more dimples corresponding to the protrusions are provided on a surface of the cavity. The home position of the cam relative to the housing is defined by the protrusions seating within the dimples.

A sensor is provided to detect displacement of the cam relative to the housing. Preferably, a proximity sensor is adjustably mounted on the housing and detects displacement of a target provided on the head portion of the cam. By adjusting the location of the proximity sensor, the sensitivity of the sensor can be adjusted.

BRIEF DESCRIPTION OF THE DRAWINGS

The present invention will be more fully understood by reference to the detailed description below when considered in conjunction with the following drawings wherein like reference numbers denote the same or similar items shown throughout the several Figures, in which.

DETAILED DESCRIPTION OF THE INVENTION

1. Description of the Elements of the Invention a. Physical Layout

Figure 1:
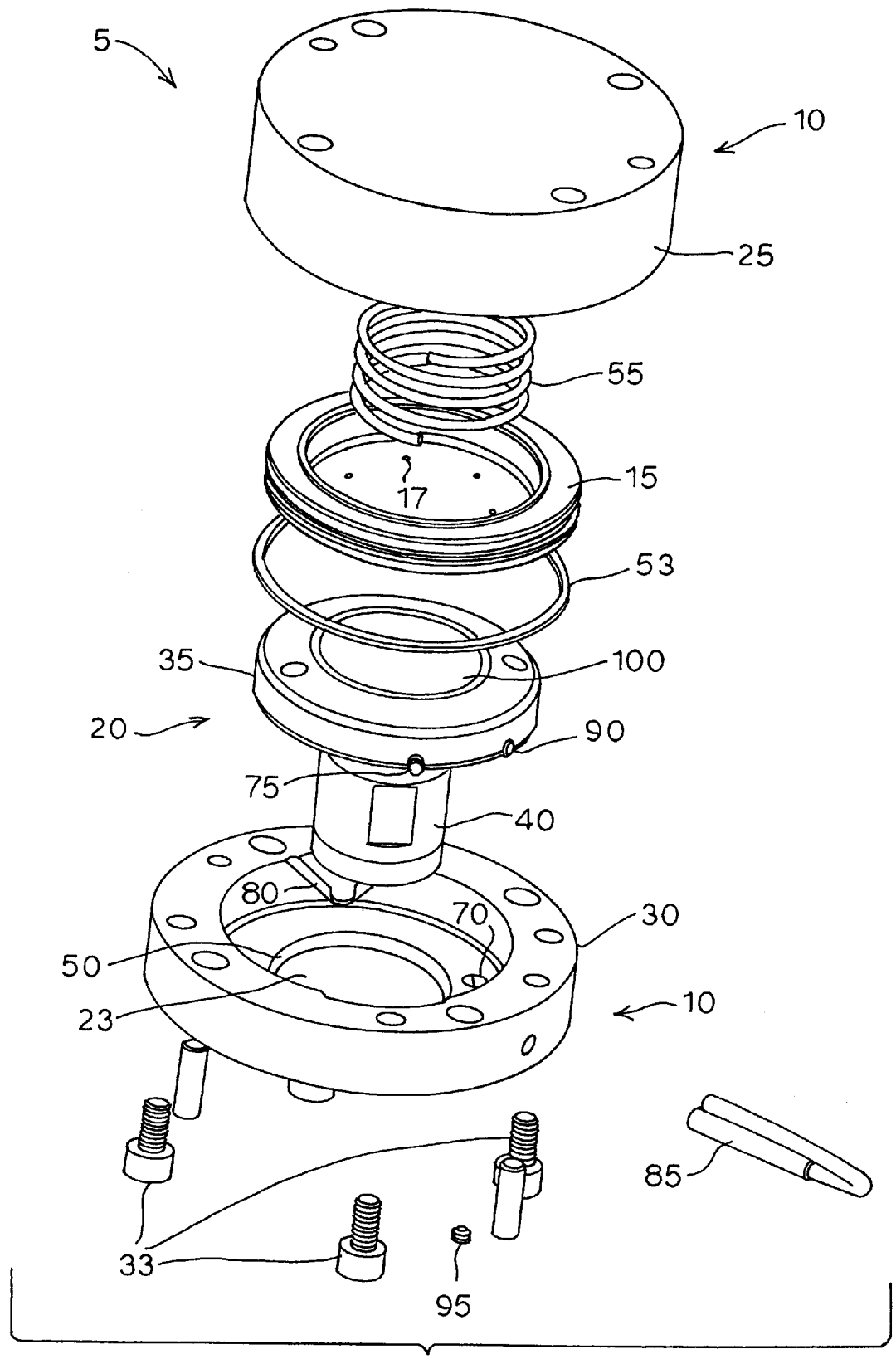
FIG. 1 is an exploded perspective view of the overload protection device of the present invention.
Figure 2:
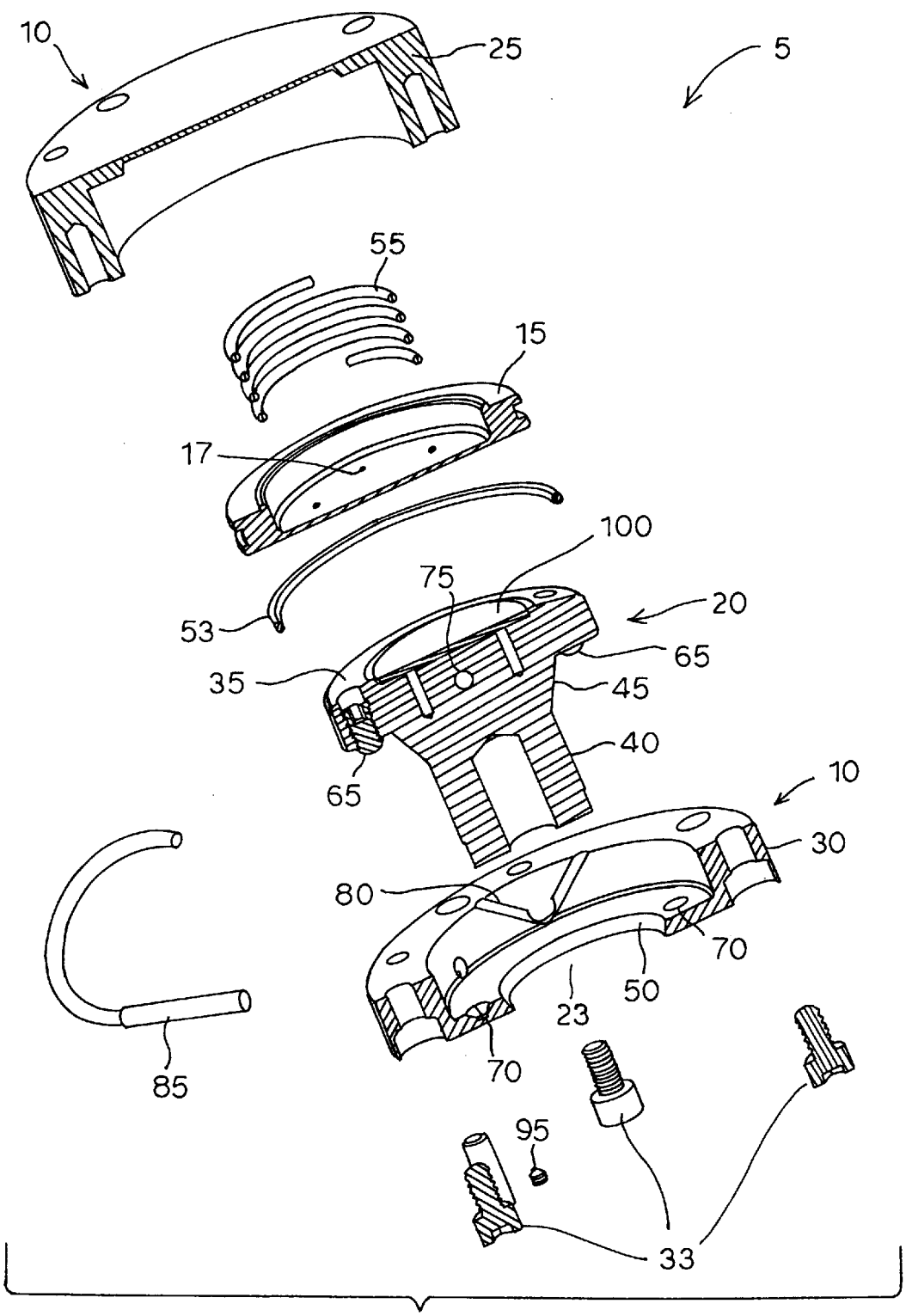
FIG. 2 is cross-sectional exploded perspective view of the overload protection device of the present invention.
Figure 3:
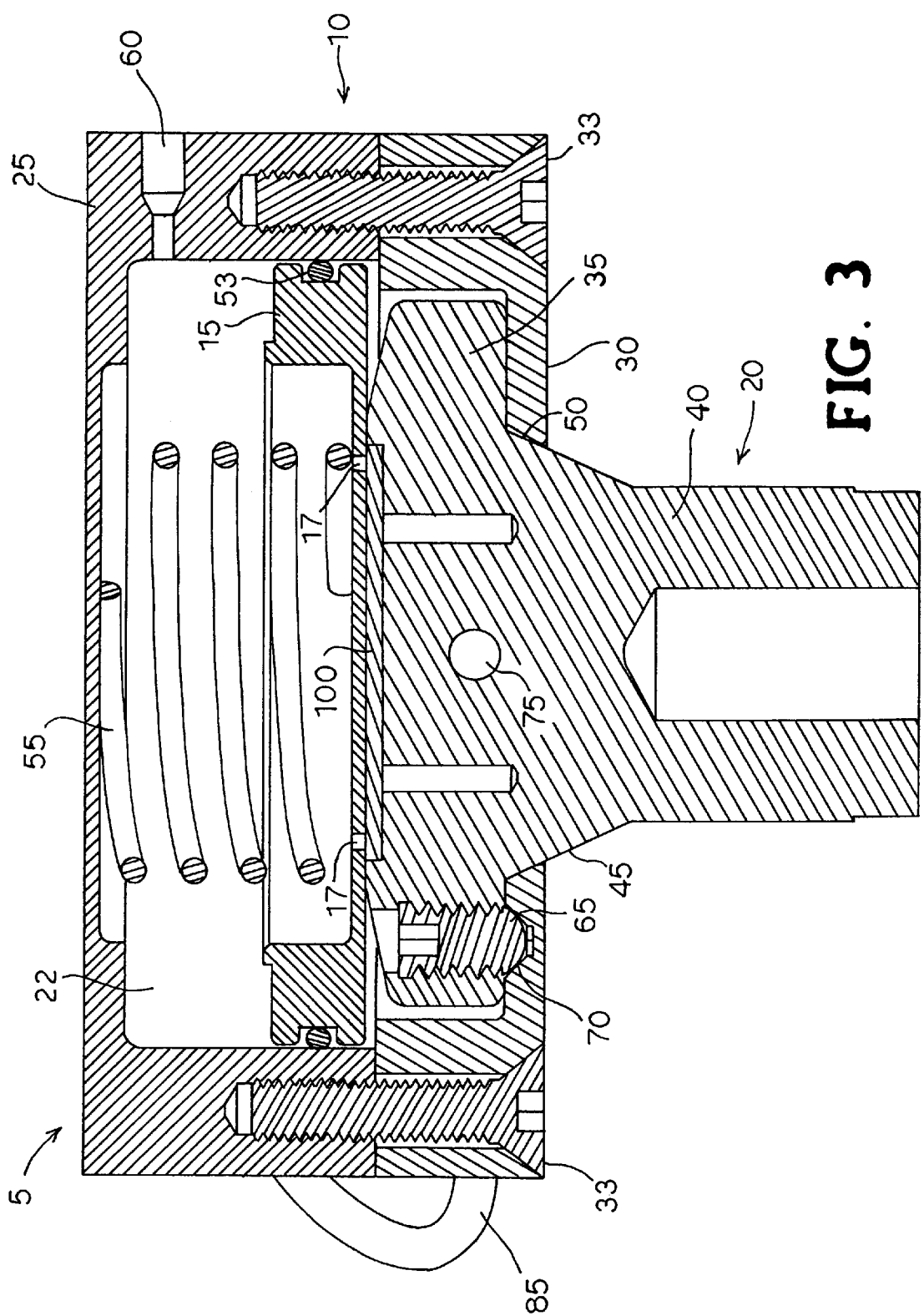
FIG. 3 is a cross-sectional front view showing the overload protection device of the present invention during a non-overload condition.

As shown in FIGS. 1–3, the overload protection device 5 of the present invention preferably comprises three main components: a housing 10, a piston 15, and a cam 20. The housing 10 has an internal cavity 22 (see FIG. 3) and an external opening 23 to the cavity (see FIG. 1). The housing 10 is preferably in two pieces, a top plate 25 and a base plate 30, which are secured together, preferably by a plurality of screws 33. The top plate 25 of the housing 10 is preferably secured to the end of the robot arm during operation.

The cam 20 preferably includes a head portion 35 and a neck portion 40, wherein the diameter of the head portion 35 is greater than the diameter of the neck portion 40. The head portion 35 of the cam 20 is retained within the cavity 22, while the neck portion 40 of the cam 20 extends through the opening 23. Preferably, the neck portion 40 of the cam 20 and the opening 23 of the housing 10 have matching conical or frusto-conical surfaces 45 and 50 (FIGS. 2 and 3), respectively, which are adapted to mate with each other. The neck portion 40 of the cam 20 is preferably secured to the work tool to be used by the robot. Alternatively, the housing 10 could be secured to the work tool and the neck portion 40 of the cam 20 could be secured to the robot.

Figure 6:
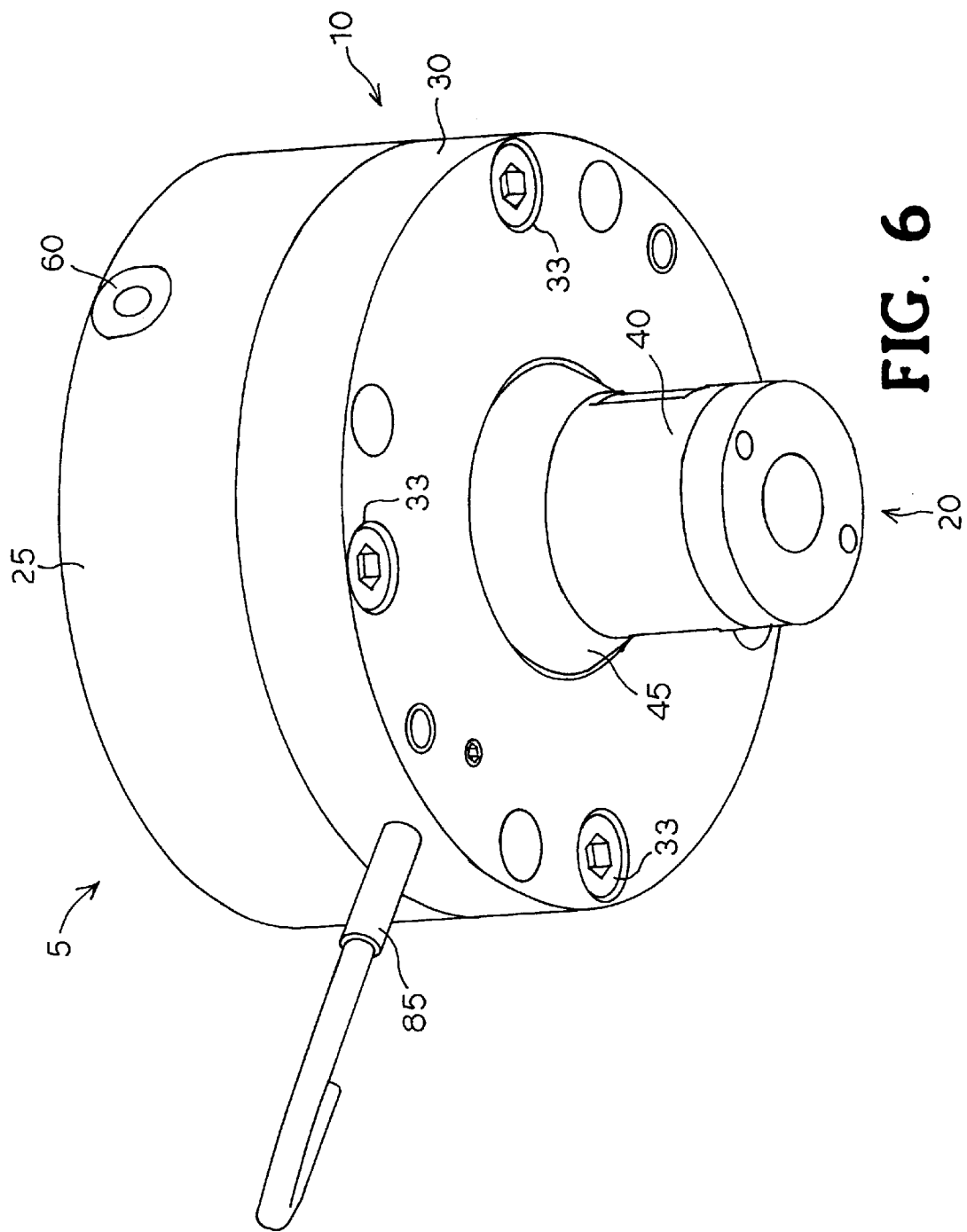
FIG. 6 is a perspective view of the overload protection device of the present invention in an assembled state.

The piston 15 is disposed within the cavity 22 above the head portion 35 of the cam 20, and preferably is sealed with an o-ring 53. The piston 15 is urged downward by a spring 55, by air (or other fluid) pressure, or both. Preferably, both a spring 55 and air pressure are used to urge the piston 15 downward. The spring 55 is disposed between the top of the piston 15 and the top surface of the cavity 22. The air pressure may be supplied from the robot or another control device through an air inlet 60 (FIGS. 3 and 6) in the housing 10. Under the force of the spring 55 and/or the air pressure, the piston 15 presses on the head portion 35 of the cam 20, causing it to seat firmly against the lower surface of the cavity 22. The cam 20 is held in this position by the piston 15 during non-overload conditions.

Optionally, the piston 15 could have one or more holes 17 provided in it. When the piston 15 is pressed firmly against the head portion 35 of the cam 20 (as shown in FIG. 3), the holes 17 are substantially sealed by the head portion. As a further option, the top surface of the head portion could be provided with a seal 100 made out of an elastomeric material such as teflon for more effectively sealing the holes 17.

As an alternative to the above arrangement, the spring 55 or the air pressure could act directly on the cam 20 to hold it in place, instead of working via the piston 15.

Preferably, the under side of the head portion 35 is provided with one or more protrusions 65 (preferably two protrusions 65) which seat in corresponding dimples 70 in the floor of the cavity 22. As shown in the Figures, the protrusions 65 are preferably ball-end screws secured by a threadlocking compound within threaded holes in the head portion 35 of the cam 20. Alternatively, the protrusions 65 could comprise a hardened ball held captive by a screw mounted in the threaded hole. This would allow the protrusion 65 to roll in and out of the dimple 70 instead of sliding, thereby reducing friction forces.

The protrusions 65 are preferably not disposed directly across from each other (i.e., not 180 degrees apart) on the head portion 35. Alternatively, the protrusions 65 could be disposed directly across from each other, but at different distances away from the center of the head portion 35. With either placement, there is one and only one orientation in which the protrusions 65 can seat in the dimples 70

The protrusions 65 should not protrude from the head portion 35 so much that they prevent the head portion 35 from seating firmly against the floor of the cavity 22 when they are seated in the dimples 70. At the same time, the protrusions 65 should protrude enough so that they seat firmly in the dimples 70. Tight manufacturing tolerances are not necessary to achieve these goals, however, as it is possible to adjust the placement of the ball-end screws or screw and ball combinations during assembly so that the particular cam is a custom fit for the housing to which it will be secured.

Mounted within, and protruding from, a bore in the head portion 35 of the cam 20, is one or more pins 75. Preferably, two pins 75 (best shown in FIG. 5) are provided. The portion of the pins 75 protruding from the cam 20 seat within wedge-shaped grooves 80 (best shown in FIG. 2) provided in the side wall of the cavity 22. During non-overload conditions, the pins 75 are seated at the bottom center of the wedge-shaped grooves 80. Preferably, the pins 75 are disposed within the bore so that they can roll freely.

In order to inform the robot of overload conditions, a sensor 85 (best shown in FIGS. 2 and 6) is mounted within a hole in the housing 10 for sensing displacement of the cam 20. Preferably an inductive proximity sensor is used, although other sensors such as contact sensors could be used. The proximity sensor 85 senses movement of a target 90 (best shown in FIG. 2) mounted on the side of the head portion 35 of the cam 20, adjacent the sensor 85. Alternatively, the sensor 85 could detect displacement of the piston 15, since it is displaced whenever the cam 20 is displaced. Preferably, a nylon tipped set screw 95 is used to adjustably secure the sensor 85 in the hole in the housing 10. By adjusting the distance from the sensor 85 to the target 90, the sensitivity of the sensor 85 can be adjusted.

b. Materials and Manufacturing

Preferably, the top plate 25, the piston 15, the cam 20 are made out of aluminum. The pins 75 and the base plate 30 are preferably made out of hardened or stainless steel. The target 90 is preferably made out of rolled steel. All parts are formed using metal shaping techniques well known in the art.

2. Description of the Operation of the Invention

When the piston 15 presses the head portion 35 of the cam 20 flatly against the floor of the cavity 22 with the protrusions 65 seated in the dimples 70, the cam 20 is in its normal non-overload position (the "home position"), as shown in FIG. 3.

Figure 4:
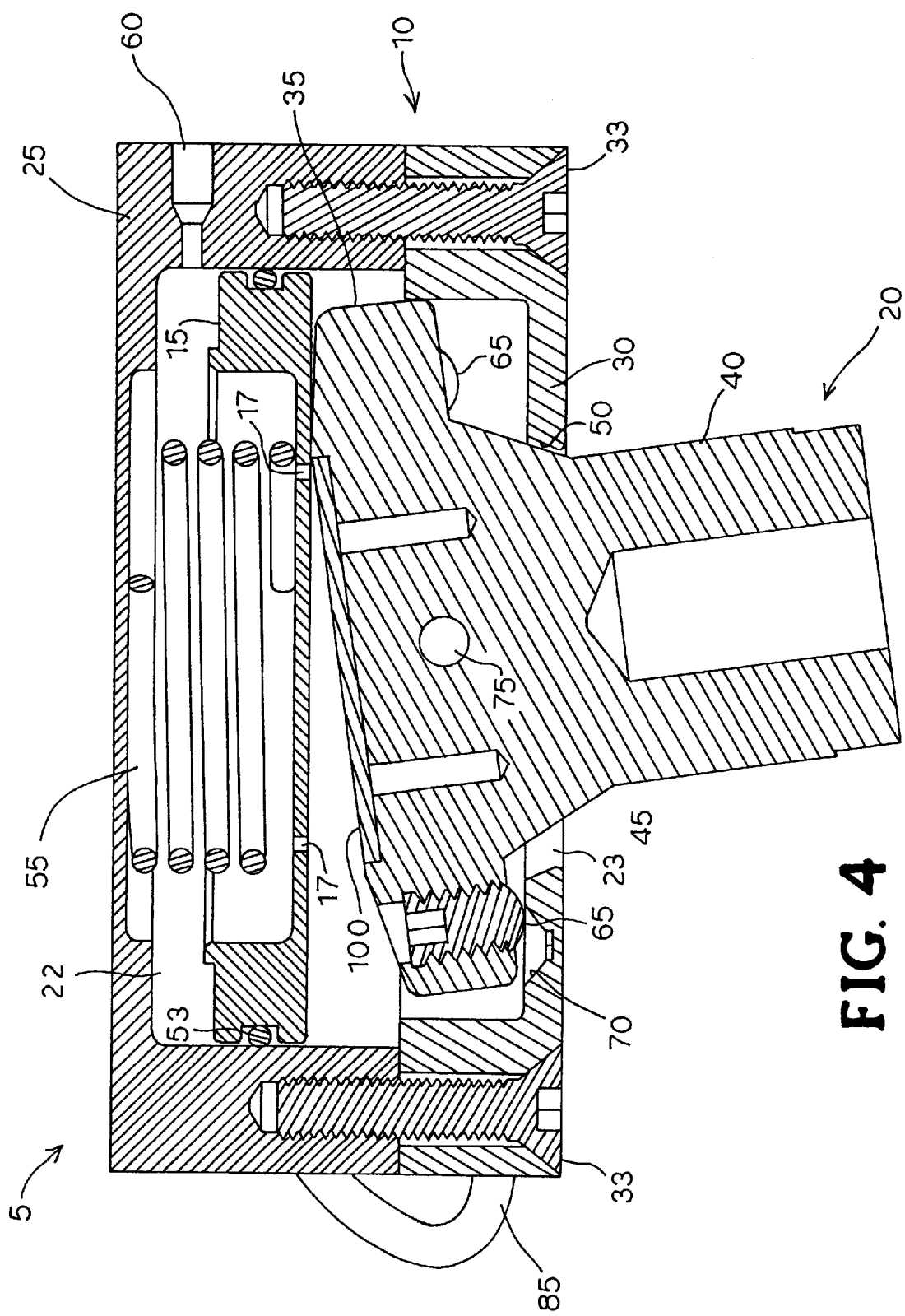
FIG. 4 is a cross-sectional front view showing the overload protection device of the present invention during an overload condition.

If the tool moves in a direction perpendicular to the axis of the overload protection device 5 (i.e., either in the x or y direction), the overload protection device 5 of the present invention appears as shown in FIG. 4. The motion of the tool causes at the cam 20 to tilt slightly and raise the piston 15 against the force of the spring 55 and/or the fluid pressure. This tilt causes the protrusions 65 to unseat from the dimples 70, and causes the conical surface 45 of the neck portion 40 to slide upwards on the conical surface 50 of the opening 23 to the cavity 22. This causes the entire cam 20 to be displaced from its home position relative to the housing 10 during an overload condition.

The tilting position of the cam 20 also unseals the holes 17 in the piston 15. This allows the air pressure acting on the piston 15 to be released through the holes 17, thereby reducing the pressure applied by the piston 15 to urge the cam 20 to the home position relative to the housing 10. This in turn, increases the amount of compliance to further prevent damage once an overload condition has occurred.

If, instead, the tool encounters an obstacle that causes it to move up along the axis of the overload protection device (i.e., the z direction), the entire cam 20 will simply lift and cause the piston 15 to rise against the force of the spring 55 and air pressure.

Figure 5:
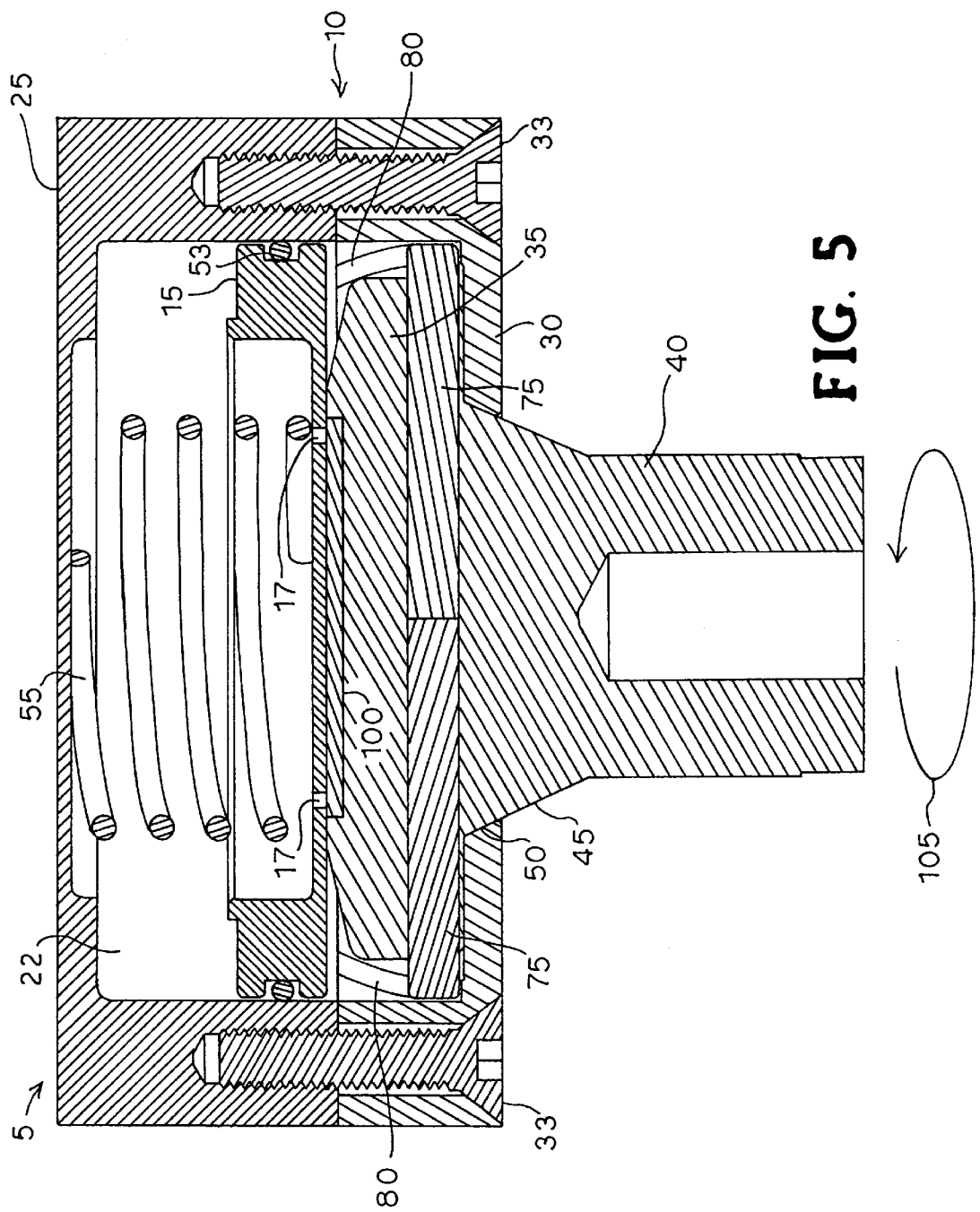
FIG. 5 is a cross sectional side view showing the rotational reset pins.

In addition to movement in the x, y, and z directions, a tool may also be subjected to a twisting movement such as that represented by arrow 105 in FIG. 5. This twisting movement is referred to hereinafter as "rotation". When the cam 20 rotates away from its home position relative to the housing 10, the pins 75 are forced to climb up the side of the wedge-shaped grooves 80. This causes the entire cam 20 to rise and lift the piston 15 against the force of the spring 55 and the air pressure. As noted above, the pins 75 are preferably mounted on the head portion 35 in such a way that they are free to roll. This allows them to roll up the side of the wedge-shaped groove 80 instead of sliding up. This substantially reduces the friction forces that must be overcome.

The wedge of the grooves 80 preferably has an angle such that the pins 75 will remain in the grooves 80 if the cam 20 is rotated twenty degrees or less in either direction, although other angles could be used. If the cam 20 is rotated more than twenty degrees from the home position in either direction, the pins 75 will unseat from the grooves 80 and will ride along the top surface of the base plate 30. This gives the cam 20 three-hundred and sixty degrees of rotational freedom.

Regardless of the direction in which the cam 20 was displaced to cause the overload condition, the piston 15 will tend to urge the cam 20 to return to the home position relative to the housing 10 when the overload condition is removed. If the cam 20 was displaced in the x, y, or z directions, the piston does so merely by pressing the cam 20 downward until it again seats firmly against the floor of the cavity 22 with the protrusions 65 seated in the dimples 70. The conical or frusto-conical surfaces 45 and 50 of the neck portion 40 and the opening 23 assist this process by helping to guide the cam 20 back to the centered position.

If the cam 20 has rotated away from the home position relative to the housing no more than twenty degrees (or whatever other angle is selected) in either direction, the piston 15, by pressing downward on the cam 20, causes the pins 75 to roll or slide back down the side of the wedge-shaped grooves 80 to their original bottom, center position within the grooves 80. This, in turn, causes the cam 20 to rotate back to the home position relative to the housing 10. If the cam 20 has rotated away from the home position more than twenty degrees (or whatever other angle is selected) in either direction, the overload protection device must be manually reset.

As noted above, the sensor 85 senses displacement of the cam 20. If an inductive proximity sensor is used, the proximity sensor 85 senses movement of the target 90 relative to the sensor 85. Because the entire cam 20 is displaced when the tool is moved in any direction, a single sensor 85 is capable of detecting all overload conditions. Preferably, the sensitivity of the sensor 85 is adjusted so that it detects displacement of the target 90 of at least twenty one-thousandths of an inch. This prevents the sensor 85 from detecting an overload condition when only incidental contact with an obstacle has been made. Once it has detected an overload condition, the sensor 85 passes a signal to the robot to let it know that it should stop moving until the overload condition no longer exists.

While the apparatus described herein constitutes the preferred embodiment of the present invention, it is to be understood that the invention is not limited to the precise form of apparatus disclosed and that changes may be made therein without departing from the scope of the invention which is defined by the following claims.

What is claimed is:

1. An overload protection device adapted to be disposed between a work tool and an instrumentality controlling the work tool to provide protection from damage when the work tool encounters an obstacle in its operating environment, said overload protection device comprising:

a. a housing attached to either the work tool or the instrumentality controlling the work tool, said housing having:

i. an internal cavity and an angled groove in a sidewall defining the cavity; and ii. an external opening to the cavity;

b. a cam having:

i. a first portion retained within the cavity; and ii. a second portion extending through the opening and attached to whichever of the work tool and the instrumentality controlling the work tool is not attached to the housing;

wherein the cam is normally oriented at a home position relative to the housing during non-overload conditions, but has the freedom to be displaced away from the home position relative to the housing when the work tool forcibly encounters an obstacle, thereby providing the work tool with compliance during an overload condition;

c. means for applying force to the cam tending to cause the cam to remain in the home position relative to the housing during non-overload conditions and tending to cause the cam to return to the home position relative to the housing when the cam has been displaced during an overload condition, wherein the amount of force applied during non-overload conditions is greater than the amount of force applied during an overload condition; and d. a pin mounted on the first portion of the cam and seating at the bottom of the groove when the cam is at the home position, so that when the tool encounters an obstacle in such a way that the obstacle causes the cam to rotate relative to the housing, the pin is forced to climb up the groove thereby causing the cam to be displaced relative to the housing against the force applying means and, when the tool no longer encounters the obstacle, the force applying means causes the pin to move back down the groove thereby causing the cam to rotate back to the home position.

2. An overload protection device as recited in claim 1, wherein:

a. the means for applying force comprises:
    i. a piston slidably disposed within the cavity above the cam, said piston having at least one hole therein; and
    ii. means for supplying fluid pressure to urge the piston into contact with the first portion of the cam;
b. when the cam is in the home position relative to the housing, the piston is at its lowermost position with its hole substantially sealed by the first portion of the cam; and
c. when the cam is displaced from the home position relative to the housing, the piston is moved upwards and its hole is no longer substantially sealed by the first portion of the cam, thereby allowing the fluid pressure to escape through the hole.

3. An overload protection device as recited in claim 2, wherein the cam further comprises an elastomeric material provided on top of the first portion, said elastomeric material serving to more efficiently seal the hole in the piston during non-overload conditions.

4. An overload protection device adapted to be disposed between a work tool and an instrumentality controlling the work tool to provide protection from damage when the work tool encounters an obstacle in its operating environment, said overload protection device comprising:

a. a housing attached to either the work tool or the instrumentality controlling the work tool, said housing having:
    i. an internal cavity; and
    ii. an external opening to the cavity;
b. a cam having:
    i. a first portion retained within the cavity; and
    ii. a second portion extending through the opening and attached to whichever of the work tool and the instrumentality controlling the work tool is not attached to the housing;
wherein the cam is normally oriented at a home position relative to the housing during non-overload conditions, but has the freedom to move and rotate away from the home position relative to the housing when the work tool forcibly encounters an obstacle, thereby providing the work tool with compliance during an overload condition; and
c. means for urging the cam to return to the home position relative to the housing regardless of whether it has moved or rotated away from the home position relative to the housing, the means for urging comprising:
    i. a wedge-shaped groove in a side wall of the cavity;
    ii. at least one pin mounted on the first portion of the cam and seating at the bottom center of the wedge-shaped groove when the cam is at the home position relative to the housing; and
    iii. means for pressing the first portion of the cam downward relative to the housing, so that when the tool encounters an obstacle in such a way that the obstacle causes the cam to rotate relative to the housing, the pin is forced to climb up one side of the wedge-shaped groove, thereby causing the cam to move relative to the housing against the force of the means for pressing, and when the work tool no longer encounters the obstacle, the means for urging causes the pin to move back down the wedge-shaped groove, thereby causing the cam to rotate back to the home position relative to the housing.

5. An overload protection device as recited in claim 4, wherein:

a. the means for urging further comprises:
    i. at least two wedge-shaped grooves in the side wall of the cavity;
    ii. at least two pins independently slidably mounted on the first portion of the cam and seating at the bottom center of the wedge-shaped grooves when the cam is at the home position relative to the housing; and
b. when the tool encounters an obstacle in such a way that it causes the cam to rotate relative to the housing, the pins roll up one side of their wedge-shaped grooves thereby causing the cam to rise relative to the housing against the force of the means for pressing.

6. An overload protection device adapted to be disposed between a work tool and an instrumentality controlling the work tool to provide protection from damage when the work tool encounters an obstacle in its operating environment, said overload protection device comprising:

a. a housing attached to either the work tool or the instrumentality controlling the work tool, said housing having:
    i. an internal cavity defined by at least one surface;
    ii. at least one dimple in the surface of the cavity; and
    iii. an external opening to the cavity;
b. a cam having:
    i. a first portion retained within the cavity, said first portion having at least one protrusion comprising a freely rolling ball; and
    ii. a second portion extending through the opening and attached to whichever of the work tool and the instrumentality controlling the work tool is not attached to the housing;
    wherein the cam is oriented during non-overload conditions at a home position defined by the protrusion seating within the dimple, but has the freedom to be displaced away from the home position relative to the housing when the work tool forcibly encounters an obstacle, thereby providing the work tool with compliance during an overload condition; and
c. means for urging the cam toward the home position relative to the housing.

7. An overload protection device as recited in claim 6, wherein:

a. the first portion of the cam comprises two protrusions located at an angle of other than 180° from each other;
b. the housing comprises two dimples in the surface of the cavity located at an angle of from each other the same as the angle between the protrusions on the first portion of the cam; and
c. the home position of the cam relative to the housing is defined by each of the protrusions seating in one of the dimples.

8. An overload protection device as recited in claim 6, wherein:
 a. the first portion of the cam comprises two protrusions located at different distances from the center of the first portion;
 b. the housing comprises two dimples in the surface of the cavity located at an angle of from each other the same as the angle between the protrusions on the first portion of the cam; and
 c. the home position of the cam relative to the housing is defined by each of the protrusions seating in one of the dimples.

9. An overload protection device as recited in claim 1, wherein the external opening to the cavity has a conical or frusto-conical surface, and the second portion of the cam has a conical or frusto-conical surface adapted to mate with the conical or frusto-conical surface of the opening to the cavity, wherein the cam is oriented during non-overload conditions at the home position relative to the housing with the conical or frusto-conical surfaces of the opening and the second portion of the cam engaging one another, but has the freedom to be displaced away from the home position when the work tool forcibly encounters the obstacle, thereby providing the work tool with compliance during an overload condition.

10. An overload protection device as recited in claim 9, wherein the conical or frusto-conical surfaces of the opening and the second portion of the cam tend to assist the means for urging in guiding the cam back to the home position when it has been displaced during an overload condition.

11. An overload protection device as recited in claim 9, wherein:
 a. the cam further comprises a target;
 b. the housing further comprises a sensor hole and a proximity sensor mounted within the sensor hole, said proximity sensor being disposed adjacent the target when the cam is in the home position relative to the housing and being adapted to detect movement of the target; and
 c. the interaction of the conical or frusto-conical surfaces of the opening and the second portion of the cam causes the target to move relative to the proximity sensor during an overload condition, regardless of the direction of displacement of the cam.

12. An overload protection device as recited in claim 1, further comprising means for sensing displacement of the second member relative to the first member and providing a signal thereof to the instrumentality controlling the work tool, thereby allowing the instrumentality to cease further movement of the work tool until the overload condition is removed; and
 means for adjusting the sensitivity of the means for sensing.

13. An overload protection device as recited in claim 12, wherein:
 a. the means for sensing comprises a target and a proximity sensor mounted on either the first member or the second member for sensing the proximity of the target to the proximity sensor; and
 b. the means for adjusting comprises means for allowing the position of the proximity sensor to be adjusted.

\* \* \* \* \*